United States Patent Office 3,460,821
Patented Aug. 12, 1969

3,460,821
APPARATUS FOR THE REACTION OF A MOLTEN SUBSTANCE AND GAS AT ELEVATED TEMPERATURE AND PRESSURE
Jaroslav Vit, Vladimir Prochazka, and Vaclav Salat, Prague, Czechoslovakia, assignors to Ceskoslovenska Akademie VED, Prague, Czechoslovakia
Filed May 15, 1967, Ser. No. 638,302
Claims priority, application Czechoslovakia, May 14, 1966, 3,227/66; June 28, 1966, 4,332/66; July 7, 1966, 4,606/66
Int. Cl. C21c 7/00; C21b 7/14; F27d 3/14
U.S. Cl. 266—34
14 Claims

ABSTRACT OF THE DISCLOSURE

A reactor including a pressure vessel for the reaction of a molten substance such as molten sodium with a gaseous substance such as hydrogen at elevated temperature and pressure, the vessel containing a vertically vibrating helical conveyor for upward transport of a solid reaction product, and a stirrer device surrounding the conveyor for subjecting the molten substance at the bottom of the pressure vessel to centrifugal force such that the solid reaction product can be transferred upwardly without contacting the molten substance.

BRIEF SUMMARY OF THE INVENTION

The invention relates to a reactor for the reaction of fluid substances.

More particularly, this invention relates to an arrangement of a reactor having at least three superimposed vessels interconnected with each other, the middle vessel acting as an autoclave, the lower vessel as a receiver for the resulting reaction product, and the upper vessel as a casing for driving means therein. One driving means produces a stirring movement of the interacting substances within the autoclave and another generates oscillations or vibrations causing a solid reaction product to be transported upwardly and transferred from the autoclave into the lower vessel.

The arrangement according to the invention is particularly applicable to the production of saline or ionic hydride. Such saline or ionic hyrides are generally prepared by direct reaction of metals with hydrogen at elevated temperatures and pressures in batch process. This reaction must proceed for a period of time, usually several hours until a sufficient amount of hydrides is produced. Various modifications of this process are disclosed in different patents, but none is acceptable for industrial production. Hydrides are a solid material not wetted by the molten metal and they form, therefore, a solid coating on the inner walls of the reaction vessel and on the surface of the molten metal. This serves to prevent the admission or transfer of heat and it makes the consumption of hydrogen incomplete unless special means are employed, such as, dispersal of the molten metal in a hydrocarbon such as mineral oil or the like, but it is very difficult to remove them from the product.

It is an object of this invention to provide a reactor which enables an intimate direct contact of the molten metal with the hydrogen and thereby provide a thorough interaction in which both components react vigorously yielding a pure product in the form of loosened finely divided light-weight particles.

It is another object of this invention to provide a reactor enabling a perfect transfer of heat despite the tendency of the initially produced hydride to form a coating on the inner wall of the autoclave which makes the heat transfer difficult.

A further object of this invention is to provide a reactor arrangement which permits an easy and continuous removal of reaction products from the autoclave in separating them from the molten metal which then proceeds to completion.

A still further object is to provide an assembly adapted to insure the performance of the heterogeneous interaction in accordance with the kinetic relations applicable otherwise only for homogeneous media in which the reaction takes place with a great initial velocity so that only small reactor vessels are necessary and the process can proceed continuously.

With the above said and other objects in view, this invention eliminates the above said drawbacks in providing a reactor especially suitable for accelerating the consumption of hydrogen during the hydrogenation of alkail metals and more particularly to an autoclave for continuously preparing saline or ionic hydrides by direct hydrogenation of the molten metals at elevated temperature and high pressure. According to the present invention the reactor comprises preferably three superimposed vessels interconnected with each other, the middle vessel functioning as an autoclave connected with the lower vessel acting as a receiver of the reaction product by means of an overflow tube passing axially through the bottom of the said autoclave and surrounded between both said vessels by means of a cooler for removal of heat from the reaction product from the autoclave. A vibrating helical trough is located inside the autoclave and surrounds the overflow tube with clearance for retaining a molten metal in the autoclave by acting as a discharging elevator for the solid product, the said autoclave furthermore being provided with a peripheral stirrer or agitator, the driving means of which together with a vibrator for said trough are lodged within the upper vessel or casing which is connected with the pressure space of the autoclave and protected against heat transfer from the autoclave by means of a bottom cooler.

This invention is based on the discovery that, in order to achieve an optimum reaction course in reactions of this type, the axis of vibration of the trough is coincident with the axis of rotation of the stirrer, the lower end of the trough being immersed in the molten reacting substance which is subjected to centrifugal force by the stirrer such that the upper surface is in the form of a vortex so that the resulting reaction product can be elevated in the trough for external discharge from the autoclave without transporting the molten reacting substance.

For a more complete understanding of this invention, reference will now be made to two embodiments of the reactor in conjunction with the attached drawing.

DETAILED DESCRIPTION OF THE INVENTION

Figure 1:
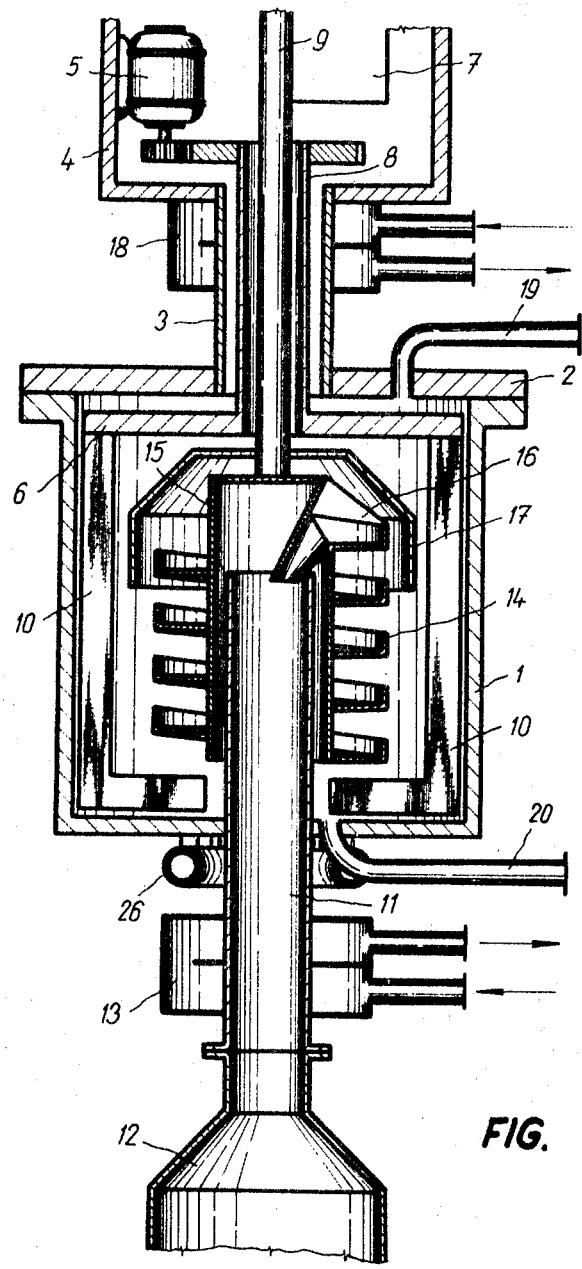
FIGURE 1 is a side view, partly in section, of a reactor arrangement of a system of three superimposed vessels interconnected with each other.

Referring to FIG. 1 of the drawing, therein is shown a reactor for performing the interaction for instance of molten sodium with hydrogen. The reactor comprises a thick wall cylindrical vessel or autoclave 1 having a head or cover 2 connected by means of an axial tube 3 with an upper vessel 4. The vessel 4 serves as a casing for enclosing an electric motor 5 as well as an electromagnetic vibrator 7. The motor 5 and vibrator 7 serve as respective drive means for a stirrer 6 and a vibratory trough 14. These drive means are respectively connected by means of coaxial shafts 8, 9 passing through the tube 3 with the stirrer 6 and with a sleeve 15 on which trough 14 is helically wound. The stirrer 6 is provided with several depending arms 10 arranged with clearance close to the inner wall of the autoclave. An overflow tube passes through the bottom of the autoclave into a receiver 12. The portion of tube 11 between the vessels 1 and 12 is surrounded by a cooler 13 which is independently supplied with a cooling fluid. Inside of the autoclave, the tube 11 is surrounded with clearance by the sleeve 15 carrying the vibratory trough 14. The upper end of trough 14 bears a hopper 16 for passing the solid product elevated from the melt into the overflow tube 11 and therethrough into the receiver 12. The upper part of the sleeve 15 bearing the trough 14 is covered by a frusto conical shield 17 preventing the contamination of the discharged product by sprayed molten metal. The drive means in the upper vessel 4 is protected against the heat of the autoclave by means of a cooler 18 situated immediately below the upper vessel and tending to maintain a relatively low temperature in the vessel 4.

In order to introduce the primary reacting substances into the autoclave, there are provided connecting branches 19 in its head or close to the cover 2 for admission of hydrogen and delivery branches 20 in the bottom for admission of molten metal.

In order to regulate the temperature of the autoclave, a heat exchanger 26 of toroidal form encircles tube 11. The heat exchanger 26 can be supplied with a heated fluid for raising the temperature of the autoclave or it can be supplied with a cooling fluid for lowering the temperature of the autoclave.

Figure 2:
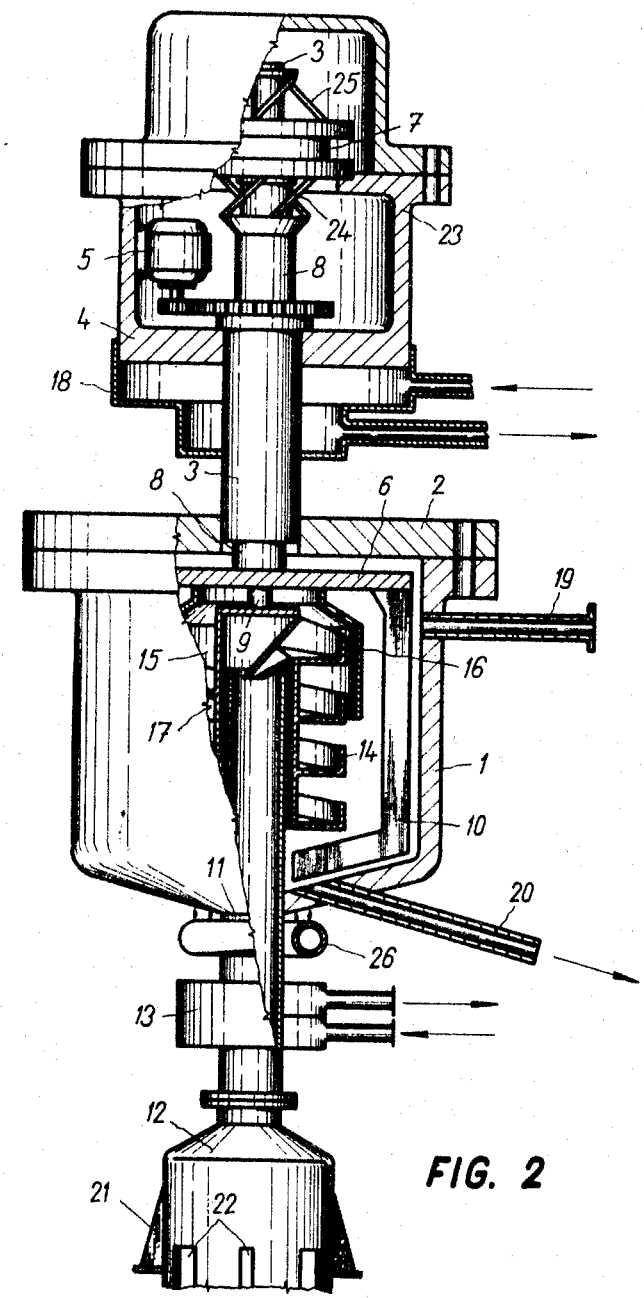
FIGURE 2 is a similar view of another embodiment of the invention.

In FIG. 2 the same numerals are used to designate elements which are the same as in the embodiment of FIG. 1. In FIG. 2 the autoclave 1 is provided with a conical or dished bottom; the heat exchanger 26 is disposed immediately beneath the dished bottom. The vibrator 7 is in the form of a magnetic vibrator comprising a solenoid 7 secured firmly on an inner flange 23 of the casing 4. The core of the solenoid is rigidly fixed on the inner shaft 9 and is supported at both sides by four torsion rods or springs 24, 25, arranged in parallel pairs at opposite inclinations and presenting a square plan view. When the solenoid is energized by alternating current, its core is retracted inside the solenoid and at the same time it is turned a slight amount, due to the oscillations produced by means of the said both arrangements of torsion springs 24, 25. In combining both these movements, special oscillations result, the frequency and magnitude of which are the result of forces acting upon the solenoid and of the characteristic values of springs of both arrangements of the four torsion rods. In contradistinction to the known vibratory elevators for transport of solid or lump materials by vibratory advancing of the same, there may be used only slight but high frequency oscillations not only for promoting an intimate contact of the reacting materials for accelerating the reaction, but also for the separating and transport of the reaction product. The receiver 12 is provided with anchoring stands 21 and with radiating ribs 22 for aircooling.

The described arrangement in FIGS. 1 and 2 operates as follows:

Before commencement of the reaction, the autoclave and the receiver are blown out with nitrogen in order to remove the air and the autoclave is heated to a temperature of 200° C., whereupon the nitrogen is replaced by heated hydrogen. Prior to reaching 200° C. but at a temperature above the melting temperature of sodium, molten sodium is admitted to the autoclave by means of a dosimetric injector. The agitator or stirrer is then put into operation and the temperature in the autoclave is further elevated up to a reaction temperature between 260 and 320° C. Then the vibrator is put into operation and the hydrogen pressure is held to a constant value of between 40 and 50 atmospheres. The molten sodium is admitted continuously in such a manner to maintain a constant amount thereof in the autoclave. As soon as a sufficient amount of the produced hydride is assembled in the receiver, the latter is emptied pneumatically after a temporary stopping of the delivery of hydrogen and metallic sodium to the autoclave. Both the stirrer and vibrator are maintained in operation during the stoppage. After the emptying of the reaction product from the receiver 12 is completed, the dosimetric admission of hydrogen and molten sodium is resumed. For the purpose of compensating for the high consumption of discharged hydrogen, the latter is admitted in a relatively greater amount than that required for the equimolecular proportion.

By the cooperation of the stirrer and electromagnetic vibrator, the reacting mass as well as the reaction product are maintained in a state of intimate dispersion or surface distention, preventing their agglomeration and therefore also the creation of a compact solid mass resembling a vitreous slag.

It is important to bear in mind that most chemical reactions are assisted in the presence of substances acting as catalysts or accelerators. Therefore, it is possible to use such substances as introduced, for instance, together with hydrogen. The course of reaction is very accelerated thereby and at the same time the solid product is continuously guided in loosened, lightweight form along the oscillating helical trough from the melt and into the hopper and thereby into the receiver 12 for the product.

At the same time it is advantageous that the stirrer acts upon the mass so as to subject the substances to centrifugal force and form a vortex surface, the helical trough being immersed in the mass at its lowermost depth at its center. All that is necessary is that there must be a sufficient mass in the vessel so that the bottom of the helical trough remains immersed in the mass. Thereby a very effective separating of the reaction product from the melt proceeds which is not wetted by the melt and is supplied in a very pure state which needs no purification.

The same apparatus can be used in an analogous way also, for producing red-lead or minium from molten lead and zinc white from molten zinc in contact with air or oxygen.

What is claimed is:

1. A reactor comprising a pressure vessel adapted for receiving a molten reaction substance and a gaseous reaction substance, vibrating transport means in said vessel for receiving and conveying solid product of the reaction upwardly in said vessel, means extending in said vessel for receiving the reaction product from the vibrating transport means and for transferring the reaction product externally of the pressure vessel, stirrer means in said vessel surrounding the vibration means for stirring the molten reaction substance and producing, by centrifugal force, a vortex surface for the molten reaction substance, whereby the reaction product can be advanced upwardly by said transport means without said molten substance, and drive means located externally of said pressure vessel and coupled to said vibration means and stirrer means for driving the same.

2. A reactor as claimed in claim 1, wherein said drive means comprises first and second drive devices respectively coupled to said vibration means and the stirrer means for driving the same independently of one another.

3. A reactor as claimed in claim 2, wherein said transport means comprises a helical trough.

4. A reactor as claimed in claim 3, wherein means for receiving the reaction product comprises a vertical tube in said reaction vessel, said transport means further comprising a sleeve encircling said tube with clearance, the helical trough being mounted externally on said sleeve, and a hopper on said sleeve coupled to said trough for conveying reaction product from the trough to the tube.

5. A reactor as claimed in claim 4 comprising a receiver vessel beneath the pressure vessel, the tube being coupled to the receiver vessel to supply reaction product thereto.

6. A reactor as claimed in claim 2 comprising a casing disposed above the pressure vessel and accommodating said drive devices.

7. A reactor as claimed in claim 6 comprising coaxial shafts coupling said drive devices with their respective transport means and stirrer means.

8. A reactor as claimed in claim 6 comprising cooling means coupled to said casing and located between the casing and said vessel for maintaining the casing at a lower temperature than said vessel.

9. A reactor as claimed in claim 5 comprising a cooling device encircling said tube between the pressure vessel and the receiver vessel.

10. A reactor as claimed in claim 9 comprising heat transfer means between the cooling device and the pressure vessel for regulating the temperature of the pressure vessel.

11. A reactor as claimed in claim 1, wherein said pressure vessel has a bottom of conical shape.

12. A reactor as claimed in claim 2, wherein said drive device for the transport means comprises a solenoid having a winding body and a core, and an arrangement of four torsion rods between said core and the winding body on opposite sides of the latter, said four rods being arranged in inclined parallel pairs to produce angular oscillation for the core as it axially oscillates.

13. A reactor as claimed in claim 1, wherein said transport means has an axis of vibration which is substantially coincident with the axis of rotation of the stirrer.

14. A reactor as claimed in claim 1 comprising a receiver vessel beneath the pressure vessel for receiving the reaction product, and a casing above the pressure vessel accommodating said drive means, said receiver vessel, pressure vessel and casing being in axial alignment.

References Cited

UNITED STATES PATENTS

| | | | |
|---|---|---|---|
| 1,943,307 | 1/1934 | Gilbert | 266—34 X |
| 2,981,608 | 4/1961 | Cunningham | 23—270 |
| 3,212,859 | 10/1965 | Mitacek | 23—270 X |
| 3,399,878 | 9/1968 | Merles | 266—34 |

J. SPENCER OVERHOLSER, Primary Examiner

EUGENE MAR, Assistant Examiner

U.S. Cl. X.R.

23—269, 283, 284; 266—38